June 2, 1970   J. ORNSTEIN ET AL   3,515,262
RECEPTACLE UNIT AND KIT

Filed Dec. 13, 1968   2 Sheets-Sheet 1

INVENTORS
JUDY ORNSTEIN
LEONARD ORNSTEIN

BY Leonard W. Swift
ATTORNEY

June 2, 1970  J. ORNSTEIN ET AL  3,515,262
RECEPTACLE UNIT AND KIT

Filed Dec. 13, 1968  2 Sheets-Sheet 2

INVENTORS
JUDY ORNSTEIN
LEONARD ORNSTEIN

BY

Leonard W. Suroff
ATTORNEY

United States Patent Office 3,515,262
Patented June 2, 1970

3,515,262
RECEPTACLE UNIT AND KIT
Judy Ornstein and Leonard Ornstein, both of 1409
Albermarle Road, Brooklyn, N.Y. 11226
Filed Dec. 13, 1968, Ser. No. 783,688
Int. Cl. A45c *11/00;* B65d *3/22*
U.S. Cl. 206—1                                  6 Claims

ABSTRACT OF THE DISCLOSURE

The invention provides for a receptacle unit including an inner shell that is preferably disposable and an outer shell for receiving the inner shell in nested relation thereto and contains indicia means associated therewith that is viewable through one of the shells which is transparent. Means for releasably connecting the shells and supporting them when assembled is provided.

Figure 1:
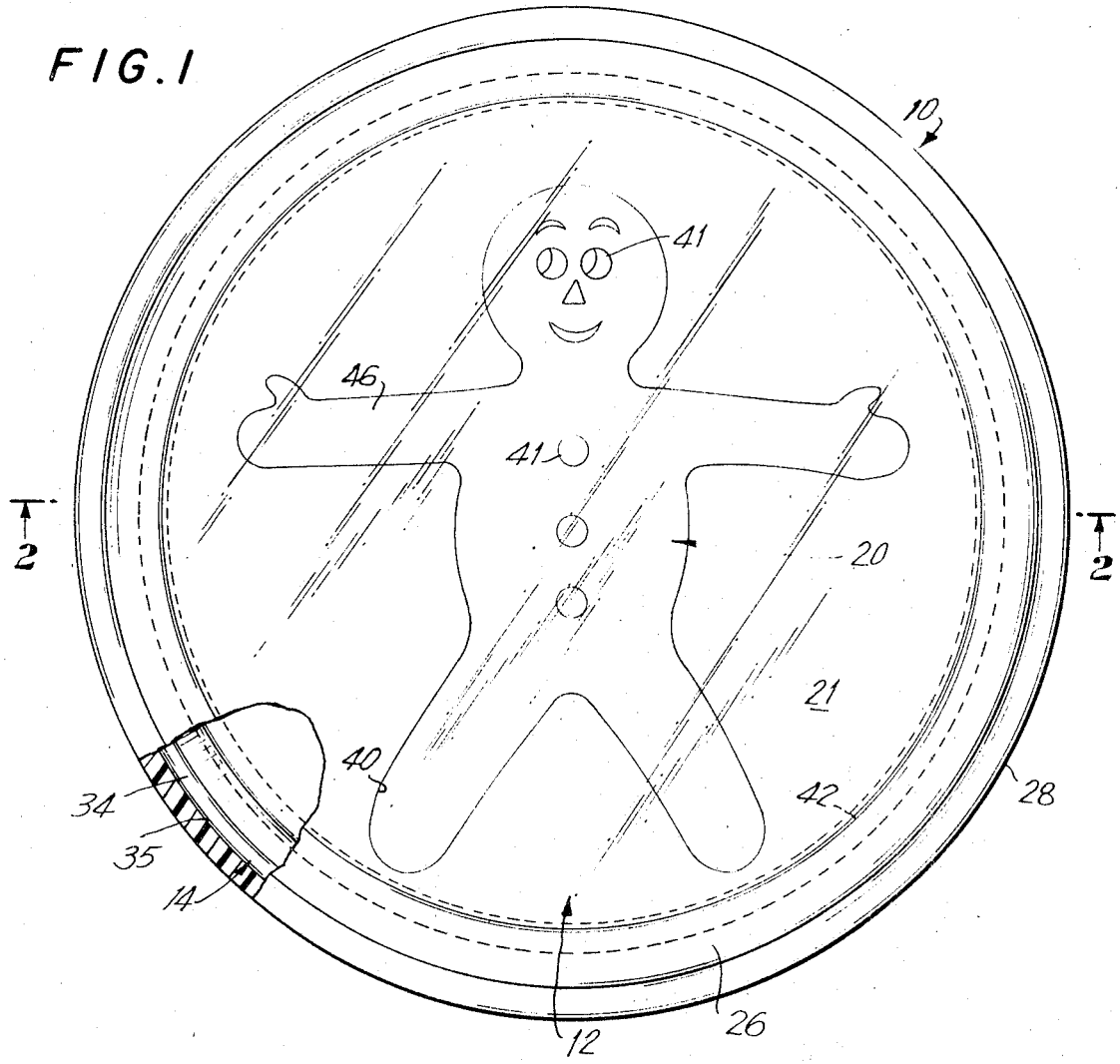

The invention also provides for a kit which includes a number of inner and outer shells, with the indicia means to be prepared by the purchaser of the kit.

BACKGROUND OF THE INVENTION

The present invention relates to receptacles in general and particularly to plates and cups of the type which may be at least partially disposed of after each use. In the area of disposable products of the type included herein such as trays, plates, bowls, cups, containers of various types and shapes, and particularly in the area of novelty items, there is provided a double walled receptacle consisting of an inner shell and an outer shell. The inner shell is of a disposable type such that the outer shell may be provided with a fixed design preferably formed in a depression that may vary, and be fabricated by the purchaser as a novelty item for parties and other events. The invention also covers a kit including the inner shells and outer shells with the material and objects necessary to form the indicia means.

OBJECTS OF THE INVENTION

A primary object of the present invention is to provide a multi-wall receptacle adapted for mass production purposes.

Another object of the present invention is to provide a receptacle unit, a portion of which is disposable and the remainder of which may be reused from time to time, and having a decorative ornament thereon that is visible to the user of the receptacle unit.

Another object of the present invention is to provide a multi-wall receptacle in the form of a plate having an inner disposable shell which is transparent and which is retained in place by an outer shell having thereon a decorative design which may be inserted in a depression formed in the outer shell.

Another object of the present invention is to provide a drinking receptacle in which the inner shell is disposable and the outer shell has thereon a depression in the form of a well adapted to receive indicia information therein and which inner shell is disposable after use.

Another object of the present invention is to provide a kit including a number of outer shells having variously shaped depressions therein and depressions adapted to have placed therein the material to form with the different configurations.

Another object of the present invention is to provide a kit consisting of inner shells of a disposable nature, permanent outer shells that are reusable and adapted to be retained in place with the inner shell and means for placing on the outer shell a decorative design by the purchaser of various configurations.

Another object of the present invention is to provide a kit in which the indicia means is placed thereon by the user in preselected patterns.

Other objects of the invention will be apparent as the description proceeds.

SUMMARY OF THE INVENTION

The aforesaid objects of the present invention and other objects which will become apparent as the description proceeds, are achieved by providing a receptacle unit having an outer or first shell, and an inner or second shell constructed so as to permit the disposability of the inner shell and the assembling of the two to form a rigid enough product for use.

To provide for the consumer an economically suitable receptacle unit, that may combine some of the inherent properties and qualities of intrinsic design it has been found advantageous to utilize an inner disposable shell which may be made out of paper or a transparent plastic and an outer shell which is generally made out of paper or transparent plastic material capable of having thereon indicia information. In accordance with one form of the invention illustrated in FIGS. 1, 2 and 3, the receptacle unit is illustrated in the form of a plate having an inner shell of clear plastic transparent material and having an outer shell of either paper or plastic with a well therein adapted to receive indicia means which may be made out of plastic or a fabric, having a desired configuration intended to convey a message if required, and the two shells are retained in fixed relation to each other. Support means in the form of legs may be integrally formed with the outer shell and extend outwardly beyond the well to support the receptacle unit. After use the inner shell is removed and may be disposed of.

Figure 4:
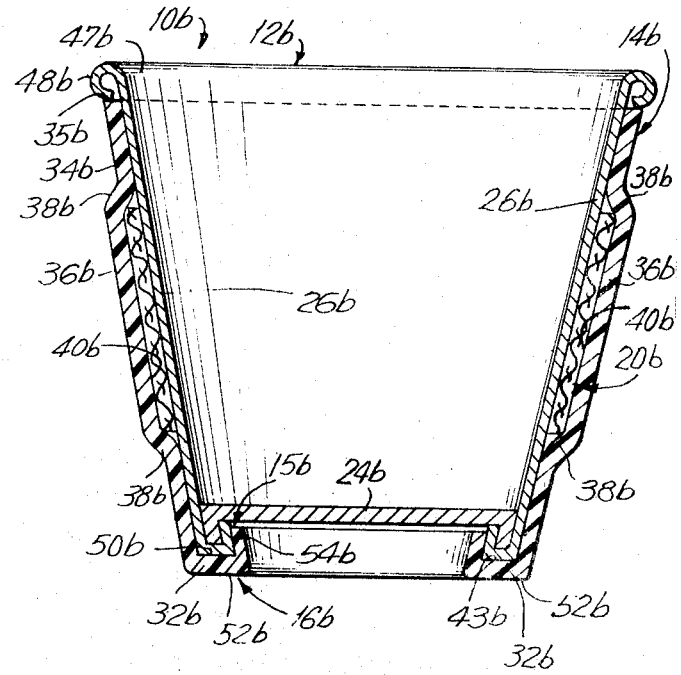

In accordance with another form of the invention illustrated in FIG. 4, a drinking receptacle unit is illustrated having an inner shell of a disposable type, such as paper or plastic and an outer shell which may be made out of a transparent plastic and having a depression therein for positioning within said well a caricature or other design which may be in the form of a decal applied by the manufacturer or preferably applied therein by the purchaser. When the shells are assembled together the novel design is visible to the user through one or both of the shells and since in each instance the novel design is maintained between the overlapping portions of the inner shell and outer shell it remains free from contamination of the food or liquids being used within the receptacle.

Figure 5:
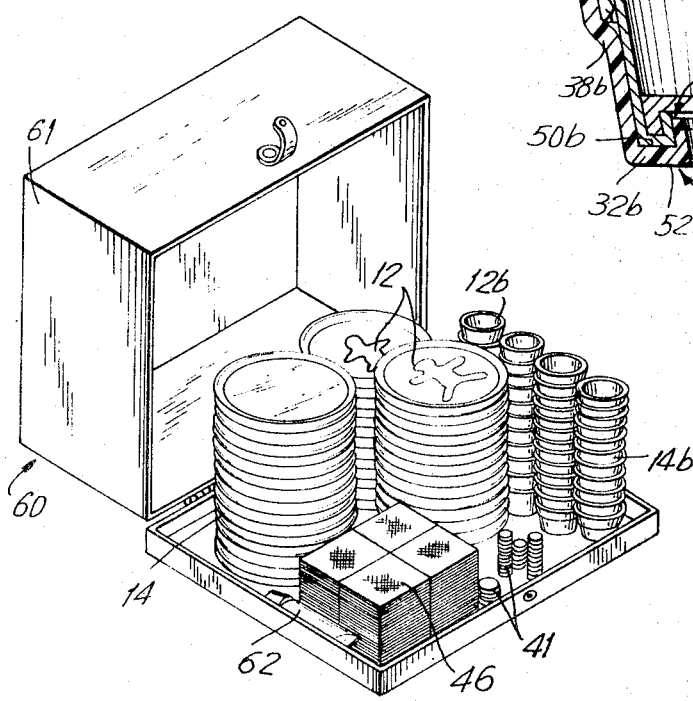

The wells either can be of a configuration conforming to the design required or if desired may be of a rectangular or other geometric shape and the user may combine the materials supplied if the invention is utilized in kit form, as illustrated in FIG. 5, so that he might himself place therein whatever configuration is desired.

PREFERRED EMBODIMENTS OF THE INVENTION

Figure 2:
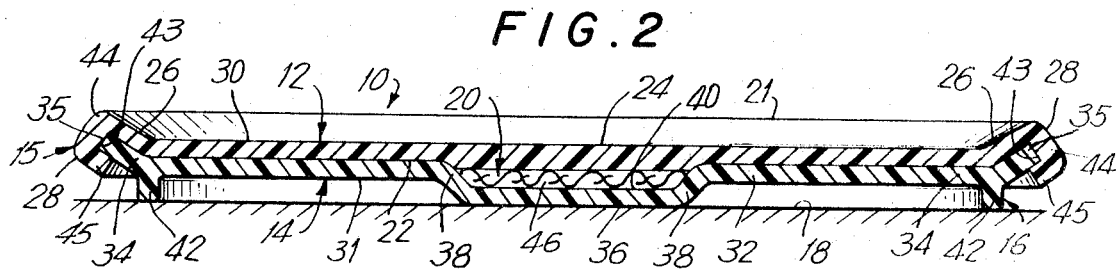

In accordance with the invention and as illustrated particularly in FIGS. 1 and 2, we have a receptacle unit 10 which briefly includes an inner shell 12 and an outer shell 14 which are removably connected together by retaining means 15, with supporting means 16 integrally formed with one of the shells for positioning of the receptacle unit on a planar surface 18. A variety of indicia means 20 may be interposed between the overlapping walls of shells 12 and 14 for viewing through one of the shells which is of a transparent material.

The inner shell 12 is formed as a receptacle, which is preferably adapted to be of a disposable construction and accordingly might be manufactured out of a paper or plastic material, such that after one or several uses it may be discarded. The inner shell 12 which is illustrated to be in the form of a plate, tray, etc., has a front surface 21 and rear surface 22 with a central bottom portion 24 having an upwardly tapering side wall portion 26 integrally formed therewith and terminating in a peripheral annular edge 28.

The outer shell 14 which may be likewise made out of paper material or plastic material which may be transparent, has a conforming configuration to the inner shell 12 for assembly therewith in nested relationship and includes a front surface 30 and rear surface 31 with a central bottom portion 32 with an upwardly tapering side wall portion 34 integrally formed therewith and terminating in an outer edge 35. The respective bottom portions 24 and 32 and side wall portions 26 and 34 are rested in overlapping relationship to each other when the shells 12 and 14 are assembled as seen in FIG. 2. The bottom portion 32 of the outer shell 14 includes a depression formed by a depressed wall portion 36 which extend in a substantially horizontal plane parallel to the bottom portion 32, and having an upwardly extending connecting portion 38 such that the depression area forms a well 40 which may be in magnitude of depth a distance equal to the thickness of the bottom portion 32 of the outer shell or may be a multiple thereof depending upon the type of indicia means 20 to be placed within the well 40. As seen in FIG. 1, the shape of the well 40 may be of a certain design, for the indicia means 20 which may be fabricated from a material and other objects, and may be either of a figure as illustrated or contain other defined information such as advertising. The figure may include objects 41 which form the eyes and buttons of the garment with material 46 forming the body thereof. In accordance with this invention the indicia means 20 may be placed therein by the purchaser of a kit herein described in detail, but it is well appreciated that the indicia means 20 may be placed therein by the manufacturer of the receptacle unit 10.

To support the receptacle unit 10 the supporting means 16 is provided, and as illustrated in FIG. 2, it is shown to be integrally formed with the outer shell 14 for positioning of the receptacle unit 10 on a planar surface 18, and includes at least one leg 42 extending from the rear surface 31 of the outer shell 14 and having a length at least equal to the depressed wall 36 formed in the outer shell 14 such that if desired the planar surface 18 comes in contact with the leg 42 and depressed wall 36. The leg 42 may be in the form of an annular rim or may include a plurality of intermittently spaced legs to obtain the desired support.

Since the inner shell 12 is preferably disposable the retaining means 15 is provided to releasably connect the shells together and facilitate their separation when desired. To provide the snap on relationship the inner shell 12 contains the retaining means 15 which includes a substantially horizontally extending annular receiving groove 43 formed by a downwardly extending rim portion 44 terminating in an inwardly extending tab or shelf 45 for forming the groove 43. The spacing between bottom surface 22 of the inner shell 12 and the shelf 45 is designed to receive the outer edge 35 of the outer shell 14 and a portion of the side wall 34. Since the inner shell 12 is preferably made of plastic it has a certain degree of resiliency permitting it to be flexed over and onto the outer edge 35 of the outer shell 14. Depending on the size and configuration of the respective shells the outer edge 35 of the outer shell 14 may be continuous or have intermittently extending portions such that the overlapping relationship between the two shells is not continuous, which in certain instances facilitates their assembly and removal.

Figure 3:
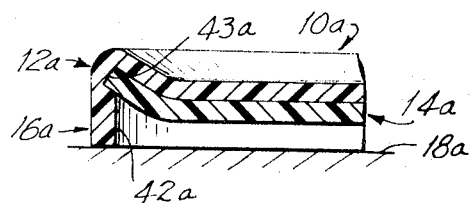

FIG. 3, shows a modification of the receptacle unit 10a such that the supporting means 16a includes a continuous or intermittently spaced leg 42a extending downwardly from the inner shell 12a for engagement with the planar surface 18a and having a length at least equal to the depression formed in the outer shell 14a. The retaining means 15a similarly includes a groove 43a communicating with the inner shell 12a.

FIG. 4, illustrates another embodiment of the receptacle unit 10b in which the inner shell 12b is in the form of a drinking vessel and may be of a disposable or reusable type and made either of paper, or plastic, which plastic may be transparent. The inner shell 12b includes an open top 47b formed by a rim portion 48b at one end thereof and a bottom portion 24b horizontally extending and conventionally secured to the side wall portion 26b at the bottom edge 50b thereof, which bottom is of a smaller diameter so as to obtain a frusto-conical configuration such that the inner shell 12b may be nestable within an outer shell 14b having a conforming relationship.

The outer shell 14b is of a longitudinal length which is shorter than the inner shell 12b and is tapered such that the side wall portion 34b thereof has a similar configuration to the side wall portion 26b of the inner shell 12b and that its outer upper edge 35b extends below the rim 48b and its bottom surface edge 52b includes the retaining means 15b and supporting means 16b which is formed by the bottom edge 52b. The outer shell 14b includes a substantially horizontally extending bottom wall portion 32b, with the bottom edge 52b on one side thereof, integrally formed with the side wall 34b and having an upwardly extending tab or shelf portion 54b which defines an annular groove 43b adapted to receive the bottom end portion including the edge 50b of the inner shell 12b when the shells are assembled in nested relationship to each other.

The supporting means 16b is formed by the bottom wall portion 52b such that it may be placed on a planar surface and that the outer shell 14b provides the structural rigidity to the receptacle unit 10b so that the inner shell 12b, which may be of a disposable design, is not relied upon for support in use. This permits the inner shell if made out of plastic to be of a very thin material in the order of .001 to .010 inch and therefore produced at a low cost.

The indicia means 20b is contained within the side wall 34b formed by the depressed wall portion 36b which is in the form of an annular band and having connecting walls 38b integrally formed with the side wall 34b. The depth of the depressed wall 36b may, as previously indicated, be equal to at least one wall thickness of the outer shell 14b or greater if so desired. The indicia means 20b may be of various shapes, sizes or configurations and placed in the well 40b by the user or manufacturer.

FIG. 5 illustrates an aspect of the invention in which the receptacle units are provided in unassembled relationship to each other in the form of a kit 60 which includes a carton 61 for retaining the respective components, which include a plurality of inner shells 12 and outer shells 14 as illustrated in FIGS. 1 and 2 and a plurality of inner shells 12b and outer shells 14b which may form a drinking vessel as illustrated in FIG. 4. The indicia means 20 is illustrated to include an array of various objects which may include fabrics or materials 46, eyes or buttons 41 as well as a supply of adhesive 62, shown in a tube, to permit the assembly of a number of outer shells with the indicia information permanently secured thereto. It is appreciated that the well formed in each outer shell may vary in shape and configuration such that at the completion of the assembly of the kit 60 a variety of shapes and configurations are produced. If used, for example, at a children's party the variety may include clowns, animals, or even cartoon figures which are known to children. For adults the shapes of the wells may be geared to their tastes. Although the wells may have preformed configurations to facilitate a particular configuration to be placed therein these may also just be geometric shapes such as cylindrical, rectangular and squares, such that the user can select from the objects supplied, his own design and the particular indicia means that he so desires.

Wherein certain representative embodiments and details have been shown for the purpose of illustrating the invention, it will be apparent to those skilled in the art that various changes and modifications can be made therein without departing from the spirit and scope of the invention.

We claim:
1. A receptacle unit, comprising:
   (A) an inner shell forming a receptacle which is adapted to be disposable, and having a bottom wall portion and a tapering side wall portion,
   (B) an outer shell having a bottom wall portion and a tapering sidewall portion in conforming configuration to said inner shell for assembly therewith in nested relationship,
   (C) a depression in said outer shell extending outwardly from said inner shell to form a well extending between the overlapping walls of said shells,
   (D) indicia means contained in said well, one of said shells being of a transparent material so that said indicia means is visible through the wall of said one shell,
   (E) supporting means integrally formed with said outer shell for positioning of said receptacle unit on a planar surface, said supporting means including an annular rim depending from the underside of said outer shell for a distance at least equal to the depth of said outer shell depression, and
   (F) retaining means to releasably connect said shells together, said retaining means including an annular receiving groove integrally formed on one of said shells with a wall portion integrally formed on said other shell adapted to extend within said groove in frictional interfitting relationship therewith.

2. A kit for forming receptacle units, comprising:
   (A) a plurality of inner shells,
   (B) a plurality of outer shells each including a well adapted to receive indicia means therein, said shells adapted to be individually assembled in nested relationship with each other with said well extending between overlapping portions of said shells, and
   (C) means for forming said indicia means contained in said kit.

3. A kit as defined in claim 2, wherein said inner and outer shells respectively are provided in nested relationship to each other.

4. A kit as defined in claim 2, wherein said indicia means includes an array of objects for insertion in said wells to form a selected design.

5. A kit as defined in claim 4, and further including an adhesive for securing said objects within said well to form said outer shell.

6. A kit as defined in claim 2, wherein said inner shells are in the form of plates and drinking vessels.

References Cited

UNITED STATES PATENTS

| | | | |
|---|---|---|---|
| 2,315,591 | 4/1943 | Carew | 220—65 |
| 2,588,727 | 3/1952 | Howard | 220—65 |
| 3,079,027 | 2/1963 | Edwards | 220—9 |
| 3,188,040 | 6/1965 | Eichler | 248—346.1 |
| 3,268,198 | 8/1966 | Swett | 248—346.1 |

FOREIGN PATENTS 1,085,536  10/1967  Great Britain.

WILLIAM T. DIXSON, Jr., Primary Examiner

U.S. Cl. X.R.

229—1.5; 220—63; 215—100.5